(12) United States Patent
Wieth et al.

(10) Patent No.: US 11,972,479 B2
(45) Date of Patent: Apr. 30, 2024

(54) METHOD FOR ISSUING AND RETURNING A LOANED ITEM

(71) Applicants: Franz Wieth, Puchheim (DE); Andreas Filosi, Puchheim (DE)

(72) Inventors: Franz Wieth, Puchheim (DE); Andreas Filosi, Puchheim (DE)

( * ) Notice: Subject to any disclaimer, the term of this patent is extended or adjusted under 35 U.S.C. 154(b) by 570 days.

(21) Appl. No.: 16/321,703

(22) PCT Filed: Jul. 27, 2017

(86) PCT No.: PCT/EP2017/069004
§ 371 (c)(1),
(2) Date: Jan. 29, 2019

(87) PCT Pub. No.: WO2018/019938
PCT Pub. Date: Feb. 1, 2018

(65) Prior Publication Data
US 2021/0287280 A1     Sep. 16, 2021

(30) Foreign Application Priority Data

Jul. 29, 2016   (DE) .......................... 102016114050.3

(51) Int. Cl.
*G06Q 30/0645*     (2023.01)
*G07F 7/06*        (2006.01)

(52) U.S. Cl.
CPC ....... *G06Q 30/0645* (2013.01); *G07F 7/0672* (2013.01)

(58) Field of Classification Search
None
See application file for complete search history.

(56) References Cited

U.S. PATENT DOCUMENTS

| | | | |
|---|---|---|---|
| 6,867,694 B2 | 3/2005 | Wieth et al. | |
| 9,676,404 B2 | 6/2017 | Margalit et al. | |
| 10,032,197 B2 | 7/2018 | Soldate et al. | |
| 2004/0059923 A1* | 3/2004 | ShamRao | G06F 21/34 |
| | | | 713/186 |
| 2008/0015886 A1 | 1/2008 | Kim et al. | |
| 2010/0313614 A1* | 12/2010 | Rzepecki | B62H 5/145 |
| | | | 70/233 |
| 2012/0119874 A1 | 5/2012 | Ciervo et al. | |
| 2013/0226371 A1* | 8/2013 | Rovik | H04L 63/102 |
| | | | 701/2 |
| 2016/0039442 A1 | 2/2016 | Tilbuerger | |
| 2017/0236343 A1* | 8/2017 | Leboeuf | H04L 9/30 |
| | | | 340/5.61 |

FOREIGN PATENT DOCUMENTS

| | | | | |
|---|---|---|---|---|
| CN | 1416558 A | | 5/2003 | |
| CN | 104205179 A | | 12/2014 | |
| EP | 0597285 B1 | * | 8/1995 | ........... B62B 3/1408 |
| EP | 2608163 A1 | | 6/2013 | |
| EP | 3444173 A1 | * | 2/2019 | ............... B62H 5/20 |
| JP | 2014026542 A | | 2/2014 | |
| KR | 100297405 B1 | | 11/2001 | |
| KR | 1020120065153 A | | 6/2012 | |
| WO | WO-2014091296 | * | 6/2014 | ............... B62B 3/18 |
| WO | 2016057610 A1 | | 4/2016 | |

OTHER PUBLICATIONS

Translaction of EP-0597285-B1, 1995.*

* cited by examiner

*Primary Examiner* — Dennis W Ruhl
(74) *Attorney, Agent, or Firm* — Laurence A. Greenberg; Werner H. Stemer; Ralph E. Locher

(57) ABSTRACT

A method for issuing and returning an item for loan, particularly a manually movable transport cart. A blocking element allows removal and use of the item by way of a release and, after a return, once more prevents the removal. A mobile communication device identifies itself to the blocking element wirelessly, the mobile communication device is associated with the item for loan when the item is released, and the association is cancelled when the item is returned. An issuing and return system has the blocking element attached to the item for loan, in particular is integrated in the item. The blocking element has a communication module for wireless communication with the mobile communication device of a customer. The mobile communication device has an identification feature, particularly a feature that personalizes the customer and which enables the association between the mobile communication device and the item for loan.

15 Claims, 1 Drawing Sheet

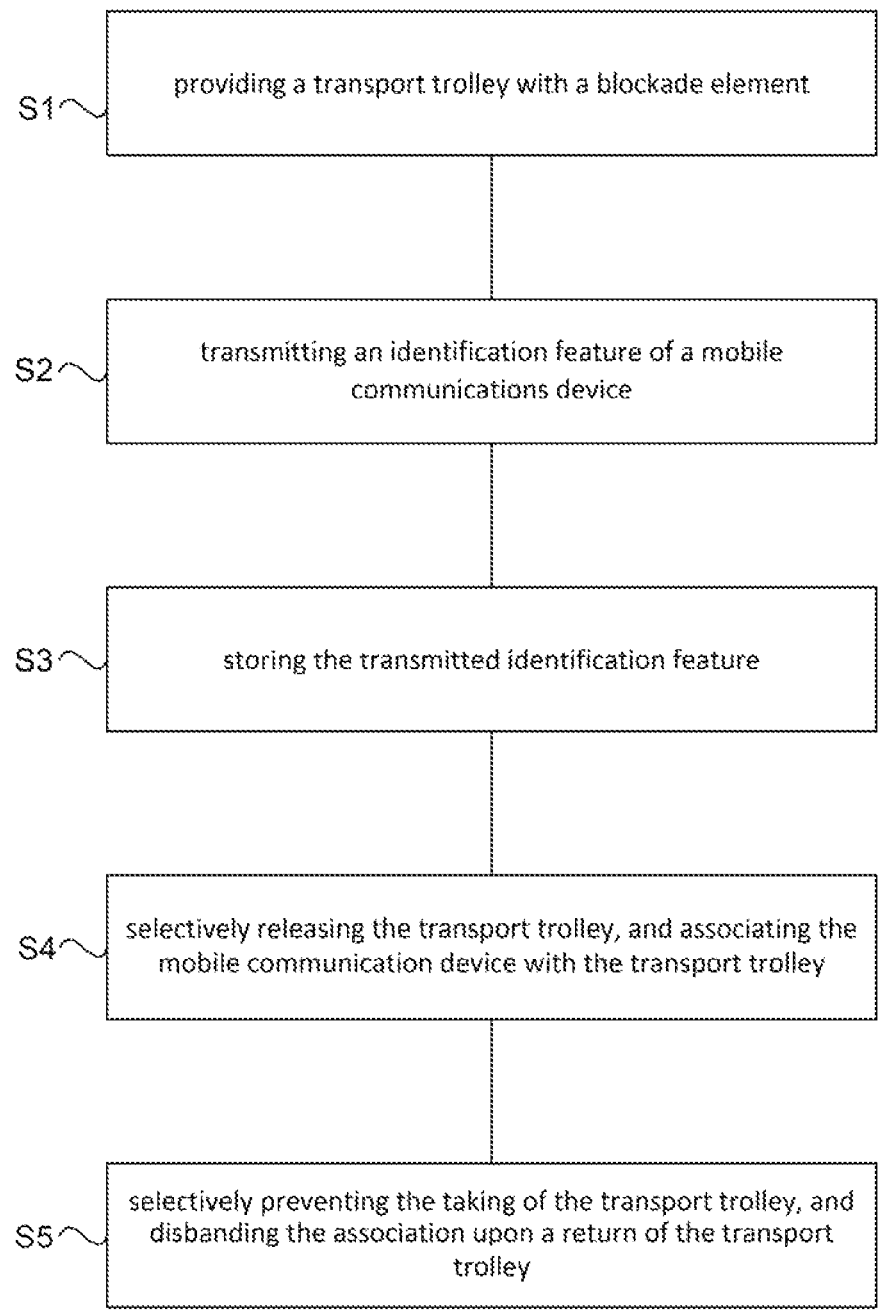

METHOD FOR ISSUING AND RETURNING A LOANED ITEM

BACKGROUND OF THE INVENTION

Field of the Invention

The invention relates to a method for issuing and returning a loaned item, in particular, a transport trolley that can be moved by hand, wherein a blockade element makes taking and using the loaned item possible by means of a release and prevents this after it has been returned again. Furthermore, the invention relates to an issuing and return system, in particular, to carry out the method where the blockade element is attached to the loaned item, in particular, thereby being integrated into the loaned item.

If items are temporarily made available to a customer or offered to him/her on loan, it is of an advantage if its issuing and return can occur without great effort. Thereby, however, it must always be taken into account that, despite the simplicity, the unauthorized taking of the item should be prevented to the furthest extent possible. If the items are provided free of charge, the customer should additionally receive an incentive to properly return the item again.

In the case of shopping or transport trolleys provided for wholesale and retail, deposit systems are therefore continuously used. Such systems make an uncomplicated taking and return of the trolleys used by the customer possible at spaces designated for this. In order to take the trolley, a suitable deposit, for example, a coin, must be inserted into the deposit lock. Since the customer would like to get back his/her deposit, the incentive also exists for him/her to return the trolley to the designated spaces again. However, this system can then only be used if a suitable deposit is available to the customer.

In the meantime, mobile communication technology has been developed in such a way that its availability and use can be generally provided. This goes hand-in-hand with the fact that it has also been used for handling a loaned item for quite some time. In this way, for example, Deutsche Bahn AG uses mobile communication technology for the rental of bikes offered in several cities under the service entitled "Call a Bike." Registered customers enter the bike number printed on the bicycle into a "Call a Bike" app on their Smartphone and subsequently receive an opening code displayed, which must be entered on the bicycle's panel to release the bicycle. For the return of the bicycle, pressing a locking butting on the bicycle is required. In the case of the solution, mobile communication technology is used in subfields, however, the interaction between the customer and the bicycle continues to take place manually.

SUMMARY OF THE INVENTION

The object of the present application is to propose a method for issuing and returning a loaned item where the actions to be carried out by the customer are further simplified. This task is achieved by means of the method as claimed and with the issuing and return system for carrying out the method according to the invention as claimed. Other favorable embodiments of the invention shall be mentioned in the respective dependent claims.

BRIEF DESCRIPTION OF THE FIGURES

The FIGURE shows a flowchart of the method.

DETAILED DESCRIPTION OF THE INVENTION

A basic idea of the invention entails handling the issuing and return of the loaned item in the most comprehensive manner possible by means of mobile communication technology. For this purpose, a method is proposed where a mobile communication means is identified with relation to the blockade element via a wireless technology, the mobile communication means is assigned to the loaned item when releasing the loaned item, wherein this assignment is disbanded when returning the loaned item again. The issuing and return system according to the invention is characterized in that the blockade element comprises a communications module for the wireless communication with a mobile communication means of a customer, wherein the mobile communication means comprises an identification feature, in particular, a feature that personalizes the customer, by means of which an assignment of the mobile communication means to the loaned item can be established.

The invention takes advantage of the fact that the modern mobile communication means, such as smartphones and also wearables, such as intelligence watches or glasses, have wireless radio technology for short-range communication. This wireless technology, such as WLAN, Bluetooth or NFC, is used for a communication and interaction of the mobile communication means with the blockade element of the loaned item S1. The blockade element must also have a wireless technology according to this. This must not mandatorily be integrated into the blockade element; it is sufficient if the communication module is clearly assigned to the blockade element.

During the course of communication, the mobile communication means is identified with relation to the blockade element S2. Suitable identification features include, for example, data stored on the smartphone, such as credit card, customer cards or other information, which make an identification of the mobile communication means possible, preferably, a personalization of the customer using the mobile communication means. In a particularly simple embodiment of the invention, the start of the identification process is triggered manually on the mobile communication means or on the blockade element.

If the identification is successful, the mobile communication means or its identified user is assigned to the loaned item. Assignment in terms of the invention means linking the data transmitted by the mobile communication means to the loaned item. This preferably takes place by saving the transmitted data within a data memory assigned to the blockade element of the loaned item S3.

Depending on the type of loaned item, it can be of an advantage to additionally send the link by means of the wireless radio means of the blockade element and/or of the mobile communication means to a central office, by which the transmitted data are processed. It is then necessary that the data of the loaned item contain a clear identification of this loaned item.

If a central registration is not required, for example, in the case of temporary use of a shopping trolley, it is sufficient to store the transmitted data in a local data memory of the loaned item. If the linking has occurred, the loaned item can be released for use S4, meaning the previously existing blockade is disbanded.

In order to end the temporary use or the loan of the item, the assignment between the mobile communication means and the loaned item is disbanded again S5. For this purpose, it is sufficient to delete or to mark the linked data accordingly.

An important aspect of the return is also the renewed blockade of the loaned item. It is particularly advantageous if the disbandment of the assignment is accompanied by an automatically renewed blockade. In a basic version, before the disbandment of the assignment, a check occurs if the loaned item has been blocked again. In the case of this variant, the loaned item must first be blocked manually before the assignment can be disbanded. This can take place by means of a sensor that displays in which state the blockade element is. In the case of a deposit lock used as a blockade element, for example, it could be checked if a key has been re-inserted into the deposit lock.

The blockade element triggers the release of the loaned item. It controls a blockade means so to speak, which can block or release the loaned item. The blockade element can be integrated into the blockade means, for example, a deposit lock. However, it is completely sufficient to simply assign the blockade element to a lock or another blockade means, or to connect it to it. In this way, usual deposit locks can be upgraded with the function according to the invention so that the alternative use of deposit coins remains possible. The blockade means of the loaned item must not mandatorily be a mechanical lock, but can preferably also be designed as an electronic lock.

The electronic lock comprises actuators, which cause the generally known blockade or release of the deposit key. In an embodiment, which is additional or alternative to this, the blockade means can also be designed as an immobilizer, which is disbanded when taking or activated during the return.

A special advantage of the invention entails that the person willing to loan the item requires nothing more than his/her mobile communication means in order to carry out the issuing and return process. The mobile communication means is used as an identification means, which is initially assigned to the respective loaned item by means of linking data. An individual key that is always assigned to a certain loaned item, such as, for example, the wireless key of a certain rental vehicle, can be done without. An otherwise necessary separate identification of the user, for example, by means of his/her customer card, is also no longer necessary. Thereby, the invention makes the simple issuing and return of loaned items possible without this having to be assigned to the user already in the run-up thereto.

It is of a particular advantage if the identification process of the mobile communication means is triggered when the mobile communication means is arranged at a certain position on the loaned item. In this case, it is no longer required to manually trigger the assignment. Rather, the start of the linking operation can be triggered by a certain positioning of mobile communication means on the blockade element or the loaned item. Favorably, this position is correspondingly marked or labeled so that the user receives instructions by means of this on how to start the linking process. The detection of the positioning of the mobile communication means can take place by measuring the strength of the wireless signal, however, also using other sensor systems, for example, via a surface, which detects the proximity or placement of the communication means.

In an additional or alternative embodiment to this, the identification process of the mobile communication means is started by means of a trigger signal.

Such a trigger signal can be sent from a mobile communication means. Preferably, the trigger signal is an ID, which, in particular, is generated by an app installed on the mobile communication means or is assigned to it.

In a favorable embodiment, the loaned item is a transport trolley, wherein the blockade element preferably is attached to the handle of the transport trolley or is integrated into its handle. A transport trolley or else a shopping trolley is a loaned item, which is frequently taken from its issuing point and brought back again. A simplification of these processes is therefore beneficial to a wide variety of users. If the blockade element is additionally attached to the handle of the transport trolley or integrated into this, it is within the direct access range of the user and can be achieved in a particularly easy manner.

In a preferred embodiment, in the case of successfully returning the loaned item, a bonus is assigned to the mobile communication means. In this way, the incentive for bringing back the loaned item is increased. The bonus can be credited in the form of points, discount coupons, miles or the like to the customer account of the corresponding business. Even if no special customer loyalty program is available, points can be credited to a general customer loyalty program, such as payback points or coupons, which are saved on the mobile communication means.

In principle, the invention is suitable for a wide variety of loaned items such as bicycles, lifting trucks, forklifts, tools and the like. If the loaned item is not provided free of charge, it is of an advantage if the release of the loaned item only takes place after payment is been made and/or a deposit has been provided. In this way, the assignment can be combined with a payment function, whereby this method step, which is otherwise to be carried out separately, is integrated into the process. The payment function can take place via a customer account, which is stored on the mobile communication means or, however, or also can be carried out by means of stored credit card data.

It is particularly advantageous if the deposit is at least partially credited again after returning the loaned item. By triggering the credit via the return process, this booking function can also be integrated into the method according to the invention.

In a particularly preferred embodiment, the method steps to be carried out by the mobile communication means are controlled via an app, in which the individual functions are merged. Such an app can be used system-wide for issuing and returning loaned items supported by the system.

The invention claimed is:

1. A method for issuing and returning a transport trolley, the method comprising:
providing the transport trolley with a blockade element, the blockade element being configured to:
wirelessly communicate with a mobile communication device;
selectively prevent the taking of the transport trolley in a locked arrangement; and
selectively release the transport trolley for use in an unlocked arrangement;
transmitting an identification feature of a mobile communications device to identify the mobile communication device with the blockade element via wireless communication;
storing the transmitted identification feature in a memory of the blockade element;
selectively releasing the transport trolley into the unlocked arrangement and associating the mobile communication device with the transport trolley; and
selectively preventing the taking of the transport trolley in the locked arrangement and disbanding the association upon a return of the transport trolley by deleting or marking the stored identification feature.

2. The method according to claim 1, wherein the transport trolley is a shopping trolley.

3. The method according to claim 1, which comprises triggering an identification process for the mobile communication device when the mobile communication device is brought into a predetermined position on the blockade element.

4. The method according to claim 1, which comprises starting an identification process for the mobile communication device by way of a trigger signal.

5. The method according to claim 4, wherein the trigger signal is an identification signal (ID).

6. The method according to claim 1, which comprises, upon a successful return of the transport trolley, issuing a bonus to the mobile communication device.

7. The method according to claim 1, which comprises issuing the release after a payment has been made and/or a deposit has been provided.

8. The method according to claim 7, which comprises at least partially refunding the deposit after the transport trolley is returned.

9. An issuing and return system for a transport trolley, the system comprising:
- a blockade element attached to, or integrated in, the transport trolley, said blockade element being configured to;
  - selectively release the transport trolley for taking and using the in an unlocked arrangement of the transport trolley; and
  - selectively prevent taking and using the transport trolley in a locked arrangement once the transport trolley has been returned;
- said blockade element including a communications module for wireless communication with a mobile communication device of a customer;
- said mobile communication device of the customer having an identification feature configured to:
  - establish an assignment of said mobile communication device to the transport trolley, wherein the mobile communication device identifies itself to the blockade element by transmitting said identification feature via wireless communication and the blockade element stores the transmitted identification feature in a memory of the blockade element,
  - establish an association of said mobile communication device with the transport trolley upon the release of the transport trolley; and
  - disband the established association of said mobile communication device with the transport trolley upon a return of the transport trolley by deleting or marking the stored identification feature.

10. The issuing and return system according to claim 9, wherein the identification feature is configured to identify the customer.

11. The issuing and return system according to claim 9, wherein said blockade element is attached to a handle of the transport trolley or is integrated into the handle.

12. The issuing and return system according to claim 9, wherein said blockade element is connected to an electronic lock and/or to an immobilizer.

13. The issuing and return system according to claim 9, wherein said blockade element is assigned to a deposit system.

14. The issuing and return system according to claim 13, wherein said blockade element is assigned to a lock of the deposit system for shopping trolleys.

15. A method for issuing and returning a transport trolley, the method comprising:
- providing the transport trolley with a blockade element, the blockade element being configured to:
  - wirelessly communicate with a mobile communication device;
  - selectively prevent the taking of the transport trolley in a locked arrangement; and
  - selectively release the transport trolley for use in an unlocked arrangement;
- transmitting an identification feature of a mobile communications device to identify the mobile communication device with the blockade element via wireless communication without a communication to a central server;
- storing the transmitted identification feature in a memory of the blockade element;
- selectively releasing the transport trolley into the unlocked arrangement and associating the mobile communication device with the transport trolley; and
- selectively preventing the taking of the transport trolley in the locked arrangement and disbanding the association upon a return of the transport trolley by deleting or marking the stored identification feature.

* * * * *